United States Patent [19]

Onishi

[11] Patent Number: 5,415,476
[45] Date of Patent: May 16, 1995

[54] DYNAMIC PRESSURE BEARING WITH CROSS GROOVES BETWEEN TWO AXIALLY SEPARATED GROUPS OF OBLIQUE GROOVES

[75] Inventor: Masayoshi Onishi, Tondabayashi, Japan

[73] Assignee: Koyo Seiko Co., Ltd., Osaka, Japan

[21] Appl. No.: 217,648

[22] Filed: Mar. 25, 1994

[30] Foreign Application Priority Data

Mar. 29, 1993 [JP] Japan ................... 5-069837

[51] Int. Cl.$^6$ ........................................... F16C 32/06
[52] U.S. Cl. ................... 384/114; 384/115; 384/118; 384/292
[58] Field of Search ............ 384/100, 114, 115, 120, 384/291, 292

[56] References Cited

U.S. PATENT DOCUMENTS

| | | | |
|---|---|---|---|
| 3,602,555 | 8/1969 | Hendler | 384/115 |
| 3,778,123 | 12/1973 | Hendler et al. | |
| 3,955,860 | 5/1976 | Menke et al. | |
| 4,141,603 | 2/1979 | Remmers et al. | |
| 4,538,081 | 8/1985 | Kamiya et al. | 310/90 |
| 4,678,348 | 7/1987 | Tielemans et al. | 384/292 X |
| 4,925,321 | 5/1990 | Maruyama et al. | 384/100 X |
| 5,129,739 | 7/1992 | Asai et al. | 384/292 |
| 5,240,332 | 8/1993 | Onishi et al. | 384/115 X |

FOREIGN PATENT DOCUMENTS

| | | | |
|---|---|---|---|
| 163211 | 7/1991 | Japan | 384/115 |
| 676925 | 8/1952 | United Kingdom | 384/120 |

*Primary Examiner*—Thomas R. Hannon
*Attorney, Agent, or Firm*—Wenderoth, Lind & Ponack

[57] ABSTRACT

In a dynamic pressure bearing having a sleeve and a shaft fitted in the sleeve, dynamic pressure generating grooves are formed on an outer cylindrical surface of the shaft. The dynamic pressure generating grooves consist of first oblique grooves disposed in a first cylindrical zone of the outer cylindrical surface, second oblique grooves disposed in a second cylindrical zone spaced from the first cylindrical zone in an axial direction, and cross grooves (or generally X-shaped grooves) disposed in an intermediate cylindrical zone between the first and second cylindrical zones. The first oblique grooves are oblique in a direction with respect to a generating line of the cylindrical surface and the second oblique grooves are oblique in a direction opposite to the direction in which the first oblique grooves are oblique. The cross grooves consist of third oblique grooves which are oblique in a direction with respect to the generating line of the cylindrical surface and fourth oblique grooves which are oblique so as to intersect the third oblique grooves. A clearance between the shaft and the sleeve is filled with a lubricant.

2 Claims, 4 Drawing Sheets

DYNAMIC PRESSURE BEARING WITH CROSS GROOVES BETWEEN TWO AXIALLY SEPARATED GROUPS OF OBLIQUE GROOVES

BACKGROUND OF THE INVENTION

1. Field of the Invention

The present invention relates to a dynamic pressure bearing having dynamic pressure generating grooves on at least one of its shaft member or its sleeve member receiving the shaft member inside thereof.

2. Description of the Prior Art

FIG. 1 shows a prior art dynamic pressure bearing having a shaft 11 and a sleeve 12. On the outer peripheral surface of the shaft 11 there are provided first oblique grooves 11a which are oblique in one direction with respect to a generating line of a cylindrical surface of the outer peripheral surface toward the rotating direction X, and second oblique grooves 11b which are spaced from the first oblique grooves 11a in the axial direction and which are oblique in a direction opposite to the direction in which the first oblique grooves 11a are oblique. The first oblique grooves 11a and the second oblique grooves 11b constitute herringbone type dynamic pressure generating grooves. A clearance between the sleeve 12 and the shaft 11 is filled with a lubricating fluid. When the shaft 11 is rotated in the rotating direction X, dynamic pressure is generated in the clearance between the shaft 11 and the sleeve 12 by the dynamic pressure generating grooves comprised of the first and second oblique grooves 11a and 11b. As a result, the shaft 11 is radially supported in the sleeve 12.

In the above conventional dynamic pressure bearing, the dynamic pressure generated in an intermediate cylindrical zone 17 between a cylindrical zone 15 where the first oblique grooves 11a are present and another cylindrical zone 16 where the second oblique grooves 11b are present is generally uniformly distributed in the axial direction, so that a bearing load and a bending moment can be supported over a wide range in the axial direction. Accordingly, the dynamic pressure bearing, even of a short bearing span, can have an increased load-supporting capacity, compared with bearings having V-shaped dynamic pressure generating grooves. Therefore, the whirl of the shaft 11 can be reduced.

However, the above-described conventional dynamic pressure bearing does not have a function of retaining the lubricating fluid in the intermediate zone 17 at the time of start-up or stoppage of the operation at which the rotating speed of the shaft is too low to cause the dynamic pressure to be generated. Therefore, when there is no or insufficient dynamic pressure, the outer peripheral surface of the shaft 11 and the inner peripheral surface of the sleeve 12 are brought into direct contact with each other in the intermediate zone 17. As a result, the contact surfaces of the shaft 11 and the sleeve 12 wear. Also when the shaft 11 of the conventional dynamic pressure bearing is erroneously rotated in reverse, the dynamic pressure generating grooves act reversely, so that the lubricating fluid flows out from between the shaft 11 and the sleeve 12. This results in deteriorated lubrication, which causes the contact surfaces of the shaft 11 and the sleeve 12 to seize up.

SUMMARY OF THE INVENTION

The object of the present invention is therefore to provide a dynamic pressure bearing for which wear of the contact surfaces of the shaft and sleeve at the time of start-up and stop can be reduced and for which seizure during reverse rotation can be prevented.

In order to achieve the above object, the present invention provides a dynamic pressure bearing comprising a sleeve, a shaft fitted in the sleeve in such a manner that a given clearance is formed between the shaft and the sleeve, and a plurality of dynamic pressure generating grooves for generating dynamic pressure in the clearance, wherein one of the sleeve and the shaft is rotatable relative to the other and wherein the dynamic pressure generating grooves are formed on at least one of an outer cylindrical surface of the shaft and an inner cylindrical surface of the sleeve, the dynamic pressure generating grooves comprising:

a plurality of first oblique grooves which are disposed in a first cylindrical zone of the cylindrical surface having the grooves, which are spaced from each other in a circumferential direction and which are oblique in a direction with respect to a generating line (i.e. a generatrix) of the cylindrical surface having the grooves;

a plurality of second oblique grooves which are disposed in a second cylindrical zone of the cylindrical surface having the grooves, the second cylindrical zone being spaced from the first cylindrical zone in an axial direction, the second oblique grooves being spaced from each other in the circumferential direction and being oblique in a direction opposite to the direction in which the first oblique grooves are oblique; and a plurality of cross grooves (or generally X-shaped grooves) which are disposed in an intermediate cylindrical zone between the first cylindrical zone and the second cylindrical zone and which comprise a plurality of third oblique grooves which are oblique in a direction with respect to the generating line and a plurality of fourth oblique grooves which are oblique with respect to the generating line so as to intersect the third oblique grooves.

In the dynamic pressure bearing with the above arrangement, when one of the shaft and the sleeve is rotated relative to the other, dynamic pressure is generated by a lubricating fluid filling the clearance between the shaft and the sleeve due to the first and second oblique grooves and the cross grooves (or X-shaped grooves), so that the shaft is radially supported relative to the sleeve. Further, the lubricating fluid is retained not only in the first and second oblique grooves disposed in the spaced first and second cylindrical zones but also in the cross grooves provided in the intermediate cylindrical zone between the first and second cylindrical zones. Therefore, at the time of start-up or stoppage, the lubricating fluid retained in the cross grooves offers a good boundary lubrication between the shaft and the sleeve, so that the contact surfaces of the shaft and the sleeve can be prevented from wearing. Furthermore, even if the sleeve or the shaft is rotated in reverse, the lubricating fluid will not readily flow out from the cross grooves, but is well retained in the cross grooves. Therefore, the contact surfaces of the shaft and the sleeve can be prevented from seizure.

If parallel grooves are instead provided in the intermediate cylindrical zone such that they extend along the generating line of the cylindrical surface parallel to the axial direction, the magnitude of the dynamic pressure to be generated would differ between portions where the grooves are present and other portions where the grooves are absent, so that the dynamic pressure distribution would be non-uniform in the circumferential direction. However, according to the present invention, since the cross grooves provided in the intermediate zone are oblique with respect to the generating line of the cylindrical surface toward the rotating direction such that the grooves cover the substantially whole circumference, the dynamic pressure generated in the clearance between the sleeve and the shaft is generally uniformly distributed in the circumferential direction. As a result, the shaft and the sleeve can be easily kept in a concentric relationship. Further, the shaft can rotate stably.

In one embodiment of the present invention, the cross grooves are continuous with both the first oblique grooves and the second oblique grooves.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
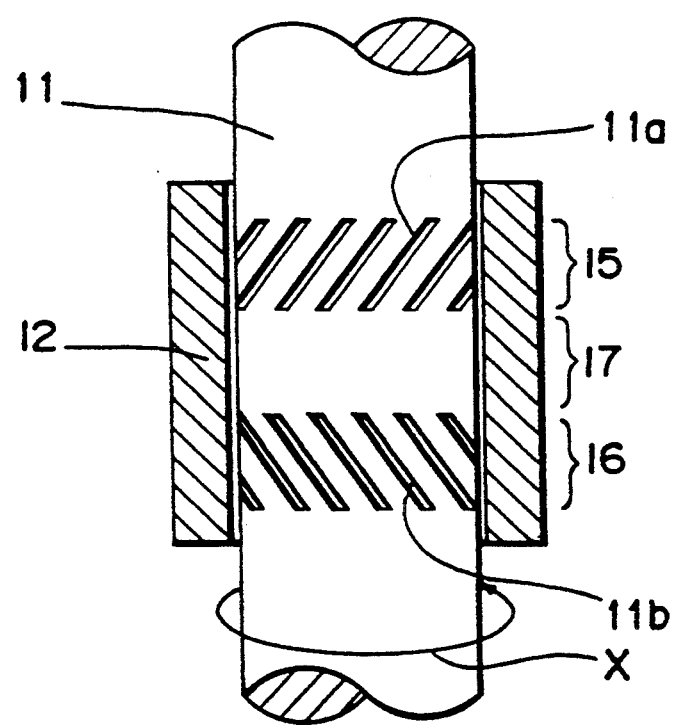
FIG. 1 is a schematic sectional view of a prior art dynamic pressure bearing.
Figure 2:
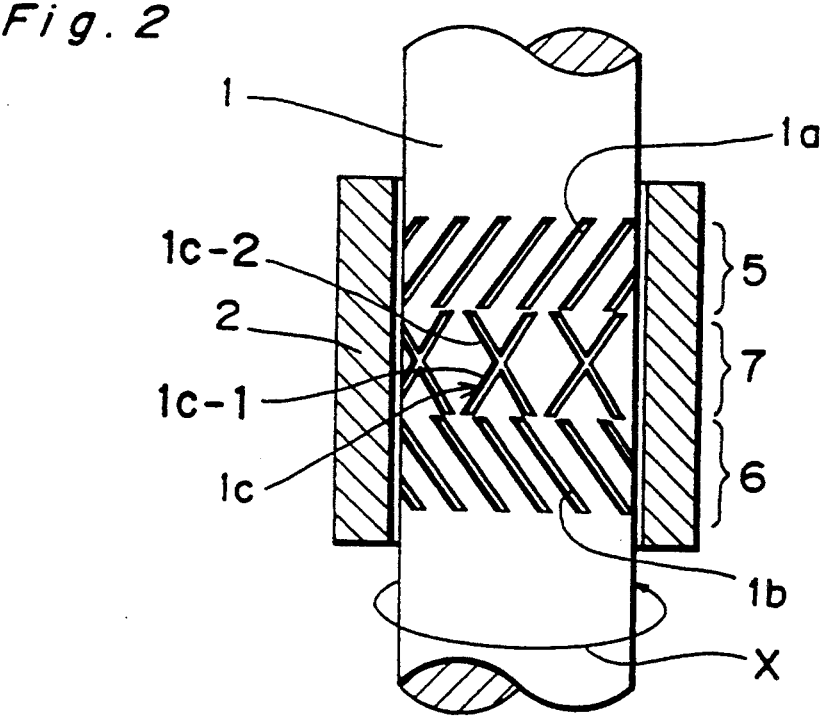
FIG. 2 is a schematic sectional view of a dynamic pressure bearing according to an embodiment of the present invention, wherein first and second oblique grooves and cross grooves are provided on an outer peripheral surface of a shaft.

FIG. 2 shows a schematic sectional view of a dynamic pressure bearing according to an embodiment of the present invention. In the figure, there are shown a rotatable shaft 1 and a sleeve 2 within which the shaft 1 is fitted in such a manner that a given clearance is left between the sleeve 2 and the shaft 1. On the outer peripheral surface of the shaft 1 which is a cylindrical surface, there are provided a plurality of first oblique grooves 1a spaced from each other in a circumferential direction. The first oblique grooves 1a occupy a cylindrical zone 5 of the cylindrical surface of the shaft 1. The first oblique grooves 1a are oblique in a certain direction with respect to a generating line (i.e. a generatrix) of the cylindrical surface toward the rotating direction X. The outer peripheral (cylindrical) surface, of the shaft 1 is also formed with second oblique grooves 1b in a cylindrical zone 6 spaced from the cylindrical zone 5 in the axial direction. The second oblique grooves 1b are spaced from each other in the circumferential direction and also from the first oblique grooves 1a in the axial direction, and are oblique in a direction opposite to the direction in which the first oblique grooves 1a are oblique. The first oblique grooves 1a and the second oblique grooves 1b constitute herringbone type dynamic pressure generating grooves. Further, cross grooves (or generally X-shaped grooves) 1c consisting of third oblique grooves 1c-1 and fourth oblique grooves 1c-2 intersecting the respective third oblique grooves are provided in an intermediate cylindrical zone 7 of the shaft 1 between the cylindrical zone 5 where the first oblique grooves 1a are present and the cylindrical zone 6 where the second oblique grooves 1b are present. The third and fourth oblique grooves 1c-1 and 1c-2 slant with respect to the generating line of the cylindrical, outer peripheral surface of the shaft 1 and intersect each other. These cross grooves 1c are not continuous with the first or second oblique grooves 1a or 1b. The clearance between the shaft 1 and the sleeve 2 is filled with a lubricating fluid such as oil.

When the shaft 1 is rotated with respect to the sleeve 2 in the direction X, dynamic pressure is generated in the clearance between the shaft 1 and the sleeve 2 by the first and second oblique grooves 1a, 1b and the cross grooves 1c on the outer peripheral surface of the shaft 1, so that the shaft 1 is radially supported in the sleeve 2. The dynamic pressure generated in the intermediate zone 7 between the zone 5 where the first oblique grooves 1a are present and the zone 6 where the second oblique grooves 1b are present is distributed generally uniformly in the axial direction. As a result, a bearing load and a bending moment are supported over a wide range in the axial direction. Also, at the time of start-up or stoppage, good boundary lubrication is offered by the lubricating fluid retained in the cross grooves 1c. Therefore, the contact surfaces of the shaft 1 and the sleeve 2 can be prevented from wearing. Further, even if the shaft 1 or the sleeve 2 is erroneously rotated in reverse, the lubricating fluid will not flow out readily from the cross grooves 1c, but is retained in the intersecting grooves 1c for a specified period. Therefore, the contact surfaces of the shaft 1 and the sleeve 2 can be prevented from seizure.

In the dynamic pressure bearing of the present embodiment, the dynamic pressure acts generally uniformly over a wide range in the axial direction, compared with bearings having a short bearing span and using V-shaped dynamic pressure generating grooves. Accordingly, an allowable support load, that is, a load supporting capacity, can be increased, so that the whirl of the shaft 1 can be reduced.

Still further, when axial grooves which are parallel to the axial direction and through which the opposed first and second oblique grooves 1a and 1b communicate with each other are provided in the intermediate zone 7, the magnitude of dynamic pressure generated around the outer peripheral surface of the shaft 1 would differ between portions at which the axial grooves are present and other portions at which the axial grooves are absent. In other words, the dynamic pressure would be distributed nonuniformly in the circumferential direction of the shaft 1. However, in the dynamic pressure bearing with the cross grooves 1c, since there are no grooves extending along the generating line of the cylindrical outer peripheral surface of the shaft 1, and the third and fourth oblique grooves 1c-1 and 1c-2 cover substantially whole the circumference, the dynamic pressure generated around the outer peripheral surface is distributed generally uniformly in the circumferential direction. As a result, the shaft 1 can be easily kept concentric with the sleeve 2x, and, a stable rotation of the shaft 1 is achieved.

Figure 6:
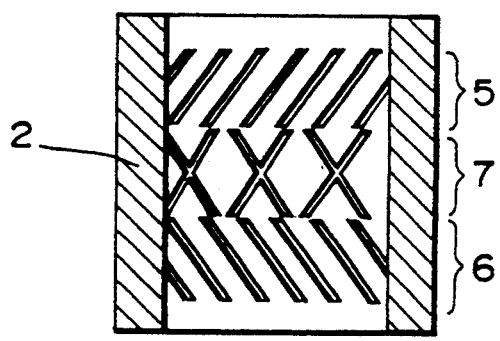
FIGS. 6 to 9 are respectively schematic sectional views of sleeves having the first and second oblique grooves and the cross grooves on their respective inner peripheral surfaces.

Although the first oblique grooves 1a, the second oblique grooves 1b, and the cross grooves 1c are formed on the outer peripheral surface of the shaft 1 in the above embodiment, it is needless to say that they may instead be provided on the cylindrical, inner peripheral surface of the sleeve 2 as shown in FIG. 6 or on both of the outer peripheral surface of the shaft 1 and the inner peripheral surface of the sleeve 2.

Figure 3:
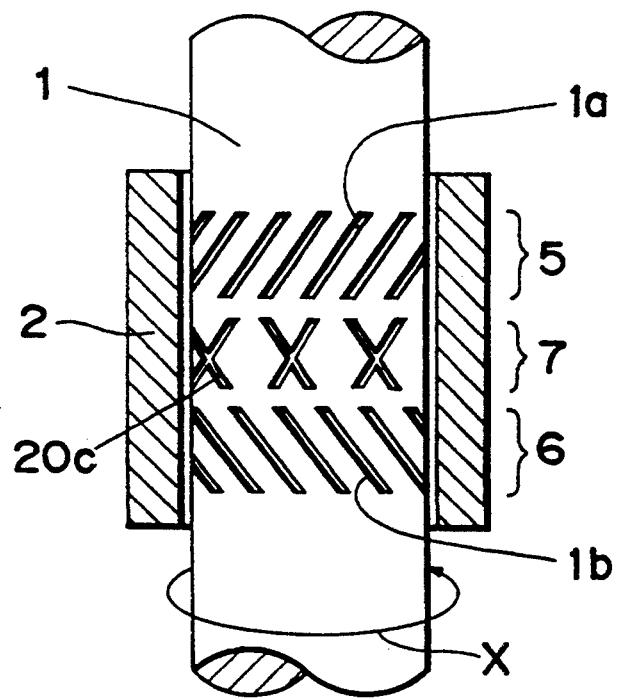
FIG. 3 is a schematic sectional view of a dynamic pressure bearing according to another embodiment of the present invention, wherein first and second oblique grooves and cross grooves are provided on an outer peripheral surface of a shaft.
Figure 7:
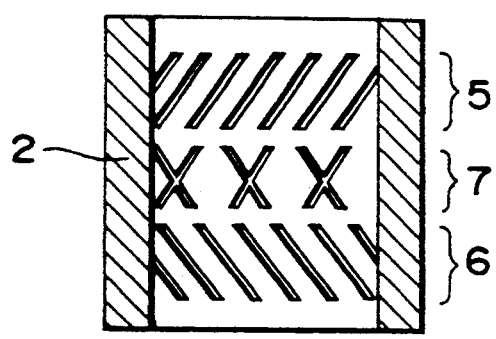

Further, although the ends of the cross grooves are very close to ends of the first and second oblique grooves 1a and 1b in the above embodiment of FIG. 2, the cross grooves may be shortened as shown in FIG. 3 in which the cross grooves (or generally X-shaped grooves) are indicated by 20c. FIG. 7 shows a case in which grooves 1a, 1b and 20c shown in FIG. 3 are formed on the inner peripheral surface of the sleeve 2 instead of the outer peripheral surface of the shaft 1.

Figure 4:
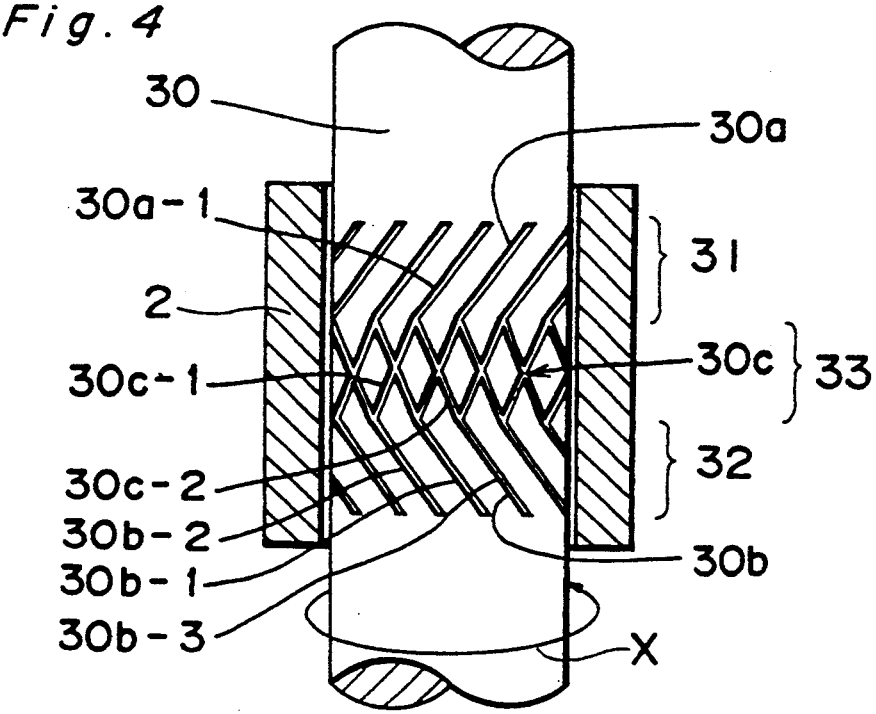
FIG. 4 is a schematic sectional view of a dynamic pressure bearing according to yet another embodiment of the present invention, wherein first and second oblique grooves and cross grooves are provided on an outer peripheral surface of a shaft.

Referring now to FIG. 4 showing a dynamic pressure bearing according to another embodiment of the present invention, the dynamic pressure bearing has a shaft 30 and a sleeve 2. The shaft 30 has first and second oblique grooves 30a and 30b, which are similar to the first and second oblique grooves 1a and 1b of the embodiment of FIG. 2, on its outer peripheral surface in a cylindrical zone 31 and a cylindrical zone 32 spaced from the cylindrical zone 31 in the axial direction, respectively. The first oblique grooves 30a in the cylindrical zone 31 are spaced from each other in the circumferential direction of the shaft 30, and the second oblique grooves 30b in the cylindrical zone 32 are also spaced from each other in the circumferential direction at the same intervals as the first oblique grooves 30a. The first and second oblique grooves 30a and 30b are opposed to each other so as to constitute herringbone type dynamic pressure generating grooves.

In an intermediate cylindrical zone 33 of the shaft 30 between the cylindrical zones 31 and 32, there are formed cross grooves (or generally X-shaped grooves) 30c. The cross grooves 30c consist of third oblique grooves 30c-1 and fourth oblique grooves 30c-2 intersecting the respective third oblique grooves 30c-1. Unlike the cross grooves 1c and 20c of FIGS. 2 and 3, the cross grooves 30c of FIG. 4, namely, the third and fourth oblique grooves 30c-1 and 30c-2, are continuous with the first and second oblique grooves 30a and 30b. More specifically, one first oblique groove 30a-1 is continuous with a corresponding third oblique groove 30c-1 and a corresponding fourth oblique groove 30c-2 which are also continuous with two second grooves 30b-2 and 30b-3 positioned on opposite sides of the second oblique groove 30b-1 opposed to the first oblique groove 30a-1. This is also true with the other first oblique grooves 30a.

Figure 8:
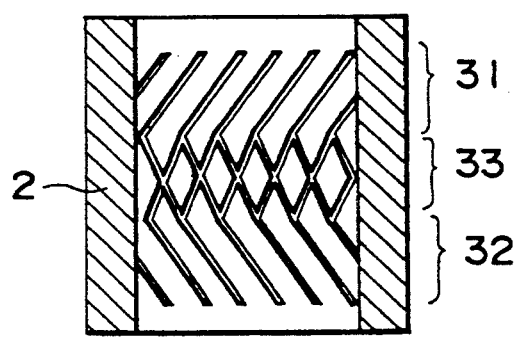

In FIG. 4, the first and second oblique grooves 30a and 30b and the cross grooves 30c are formed on the outer peripheral surface of the shaft 30. However, those grooves 30a, 30b and 30c may be formed on the cylindrical inner peripheral surface of the sleeve 2, as shown in FIG. 8, or on both of the peripheral surfaces.

Figure 5:
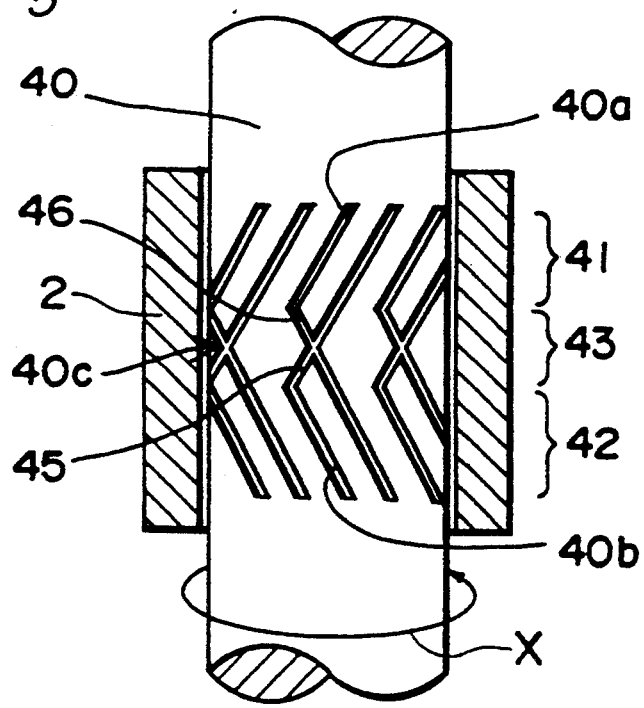
FIG. 5 is a schematic sectional view of a dynamic pressure bearing according to still another embodiment of the present invention, wherein first and second oblique grooves and cross grooves are provided on an outer peripheral surface of a shaft.

FIG. 5 shows a dynamic pressure bearing of a further embodiment of the present invention having a rotatable shaft 40 and a sleeve 2. The shaft 40 has a plurality of first oblique grooves 40a in a cylindrical zone 41 of its outer peripheral surface and a plurality of second oblique grooves 40b in a cylindrical zone 42 of the outer peripheral surface spaced from the zone 41 in the axial direction. The first and second oblique grooves 40a and 40b are similar to those 30a and 30b of the previous embodiment shown in FIG. 4. That is, the first oblique grooves 40a in the zone 41 are spaced from each other in the circumferential direction of the shaft, and the second oblique grooves 40b in the zone 42 are also spaced from each other in the circumferential direction at the same intervals as the first oblique grooves 40a. The first and second oblique grooves 40a and 40b are opposed to each other so as to constitute herringbone type dynamic pressure generating grooves.

The alternate first oblique grooves 40a extend toward the alternate second oblique grooves 40b so as to form in an intermediate zone 43 third oblique grooves 45 communicating with their corresponding second oblique grooves 40b. Similarly, the other, alternate second oblique grooves 40b extend toward the other, alternate first oblique grooves 40a so as to form in the intermediate zone fourth oblique grooves 46 communicating with their corresponding first oblique grooves 40a. The fourth oblique grooves 46 and the third oblique grooves 45 intersect each other and constitute cross grooves (or generally X-shaped grooves) 40c in the intermediate zone 43.

Figure 9:
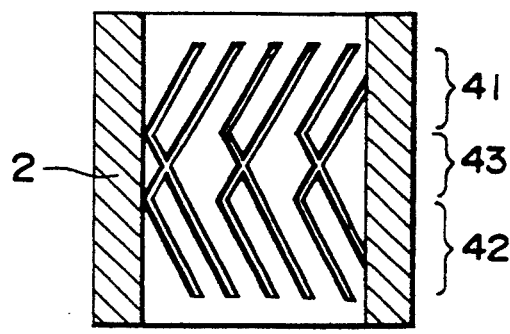

In FIG. 5, the first and second oblique grooves 40a and 40b and the cross grooves 40c are formed on the outer peripheral surface of the shaft 40. However, those grooves 40a, 40b and 40c may be formed on the inner peripheral surface of the sleeve 2, as shown in FIG. 9, or on both of the outer peripheral surface of the shaft 40 and the inner peripheral surface of the sleeve 2.

When the pressure generating grooves are formed by a rolling method using steel balls or the like which are pressed onto the outer peripheral surface of a shaft or the inner peripheral surface of a sleeve, the first oblique grooves, the second oblique grooves and the cross grooves in the embodiments of FIGS. 2 and 3 and FIGS. 6 and 7 need to be formed independently of one another because of their discontinuous formation. On the other hand, in the embodiments of FIGS. 4 and 5 and FIGS. 8 and 9, because the dynamic pressure generating grooves are continuous from the first oblique grooves to the second oblique grooves, the dynamic pressure generating grooves can be formed continuously from the first grooves to the second grooves or from the second grooves to the first grooves. Thus, the number of groove-forming processes can be decreased, as compared with the former case wherein the dynamic pressure generating grooves are discontinuous in the axial direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure bearing comprising
a sleeve, a shaft rotatably mounted in said sleeve with a given clearance formed between said shaft and said sleeve, wherein dynamic pressure generating grooves are formed on one of an outer cylindrical surface of said shaft and an inner cylindrical surface of said sleeve, and wherein said dynamic pressure generating grooves comprise:

a plurality of first oblique grooves disposed in a first cylindrical zone of said one of said inner and outer cylindrical surfaces, said first oblique grooves being spaced from each other in a circumferential direction and being oblique with respect to a line constituting a generatrix of said one of said inner and outer cylindrical surfaces;

a plurality of second oblique grooves disposed in a second cylindrical zone of said one of said inner and outer cylindrical surfaces, said second cylindrical zone being spaced from said first cylindrical zone in an axial direction, said second oblique grooves being spaced from each other in the circumferential direction and being oblique, with respect to the line constituting the generatrix, in a direction opposite a direction in which said first oblique grooves are oblique with respect to the line constituting the generatrix; and a plurality of generally X-shaped grooves disposed in an intermediate cylindrical zone between said first cylindrical zone and said second cylindrical zone, said generally X-shaped grooves comprising a plurality of third oblique grooves which are oblique with respect to the line constituting the generatrix, and a plurality of fourth oblique grooves which are oblique, with respect to the line constituting the generatrix, in a direction opposite a direction in which said third oblique grooves are oblique with respect to the line constituting the generatrix, such that said third and fourth oblique grooves intersect and cross each other, respectively.

2. The dynamic pressure bearing as set forth in claim 1, wherein
said generally X-shaped grooves are continuous with respective ones of said first oblique grooves and respective ones of said second oblique grooves.

* * * * *